INVENTORS
HENRICUS P.C. DANIELS
FRANCISCUS M.A. RADEMAKERS

United States Patent Office 3,455,015
Patented July 15, 1969

3,455,015
ULTRASONIC WELDING METHOD AND
APPARATUS
Henricus Petrus Cornelis Daniels and Franciscus Maria
Antonius Rademakers, Emmasingel, Eindhoven, Netherlands, assignors, by mesne assignments, to U.S. Philips
Corporation, New York, N.Y., a corporation of
Delaware
Filed Dec. 16, 1965, Ser. No. 514,224
Claims priority, application Netherlands, Dec. 16, 1964,
6414623
Int. Cl. B23k 27/00
U.S. Cl. 29—470.1    12 Claims

ABSTRACT OF THE DISCLOSURE

An ultrasonic-welding apparatus and method for bonding a foil composed of a ductile metal to a thin layer of a hard brittle material such as glass. The welding apparatus includes two parallel-arranged cylinders sandwiching the foil and the glass layer. One cylinder is covered by a thin layer of elastic material that separates it from the adjacent glass layer. The other cylinder is vibrated parallel to its longitudinal axis. The cylinders are rotated about their longitudinal axes. The elastic layer prevents the glass layer from breaking during the welding operation.

---

Figure 1:
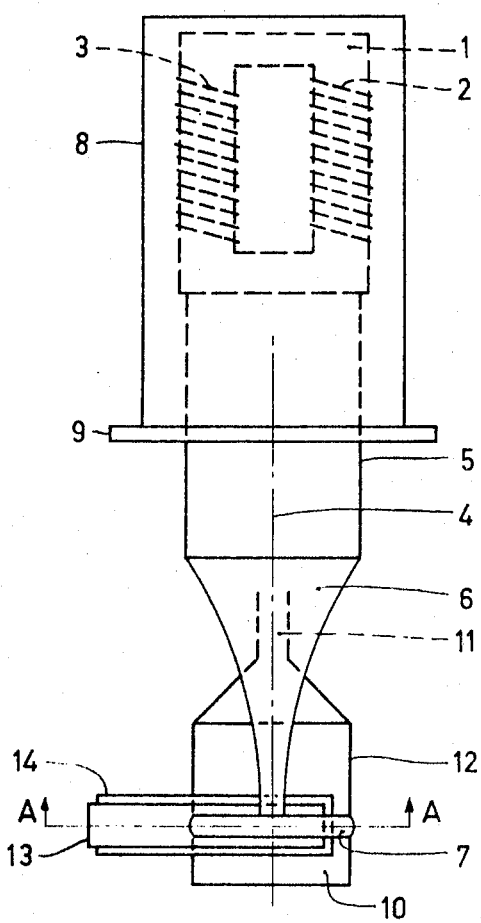

This invention relates to a method and apparatus employing vibratory energy for bonding materials together. More particularly, the invention relates to ultrasonic welding of a ductile metal such as aluminum or copper to a hard brittle material such as glass and other vitreous or ceramic substances, or to a very hard metal such as tungsten.

It is generally known that if it is not feasible to use a fusion welding process in order to bond certain materials together, such materials may often be joined by means of devices utilizing ultrasonic vibrations. In particular, it is known, for example, that in order to weld aluminum to glass, an aluminum plate and a glass plate may be clamped tightly together between a stationary rigid anvil and a thickened component part of the ultrasonic transducr which is generally referred to as a sonotrode. The sonotrode is arranged to vibrate parallel to the interface between the materials to be welded together. By means of the clamping forces produced, the sonotrode slightly penetrates at one point into the aluminum plate and carries it along during the vibration. At the same time, the glass plate is held on the anvil by friction and the vibrations cause a relative displacement between the two plates. A spot weld is thereby produced at the clamping point. In the past, in order to ultrasonically weld a ductile metal to a hard and brittle material, it has generally been considered to be of the utmost importance to avoid any displacement between the anvil and the adjoining material to be welded. It has been generally accepted that such displacement produces considerable energy losses due to friction at undesirable places whereby a large portion of the available ultrasonic energy was wasted. In view of the aforementioned importance of localizing the relative displacement at the separation face between the materials to be welded, it is common practice to avoid any displacement between the glass plate and the anvil. This is usually achieved by roughening the contact surface of the anvil so that the coefficient of friction between the anvil and the adjoining material to be welded is increased whereby a more intimate connection between the anvil and the adjoining material (glass plate) is obtained.

As mentioned above, the weld obtained is a spot weld. In order to intimately join component parts having comparatively large dimensions, it is necessary to make a great number of these spot welds so as to form a seam. For this purpose, it is known to construct the anvil in the form of a steel roll rotating about its axis and to construct the sonotrode in the form of a body of revolution which likewise rotates about its axis. The axis of the sonotrode is arranged parallel to the axis of the anvil so that the assembly drives the two components to be welded towards each other at the same speed. The ultrasonic energy is supplied to the sonotrode in the form of pulses each of which produces a spot weld. If the frequency of the pulses with respect to the driving speed of the parts to be welded is sufficiently high, or if the ultrasonic energy is continuously supplied to the sonotrode, a continuous or uninterrupted welding seam may be obtained in certain cases. However, in the case where it is desired to weld a ductile metal to a hard and brittle material, the above-described method and apparatus are subject to certain problems, the foremost of which is the tendency of the brittle material, i.e. the glass plate or the like, to break during the welding operation.

An object of this invention is to provide a novel vibratory welding process and apparatus.

Another object of this invention is to provide a novel method and apparatus for welding a ductile metal to a hard brittle material.

A further object of this invention is to provide a novel ultrasonic welding method and apparatus for bonding a thin foil composed of a ductile metal to a plate composed of a hard and brittle material.

A still further object of this invention is to provide a novel ultrasonic welding method and apparatus for seam welding a foil composed of ductile metal to a plate composed of hard brittle material.

These and other objects of the invention are accomplished by the novel ultrasonic welding method and apparatus to be described wherein a foil of ductile metal is pressed against a layer of hard material between a sonotrode and a rigid anvil. The sonotrode is in the form of a body of revolution which is in contact with the metal foil and rotates about its axis which is arranged to be parallel to the said layer. The rigid anvil also moves so that the instantaneous contact surface thereof moves at the same speed and in the same direction as the instantaneous contact surface of the sonotrode. The sonotrode vibrates at an ultrasonic frequency in a direction parallel to its axis. In accordance with the invention, a layer of elastic material is provided between the said hard material and the anvil. As a result, a novel method of ultrasonic welding is achieved wherein a continuous seam weld is produced between a ductile metal and a hard material with relatively little danger of damage to the hard material.

The term "elastic material" is to be understood herein to mean a material which is much more readily deformable than either the hard material or the anvil, but which does not easily break and is not readily dissociated either. The term "elastic" is not related here to the time in which the said elastic material resumes its original shape after a force causing deformation thereof has been removed. The deformation may even be partly permanent. The elastic material may consist of rubber, a cellulosic material, nylon, a ductile metal and so on. It can be used in the form of a ribbon or a plate glued, or only held against, the plate of hard material or against the anvil. Alternatively, in the case of a cylindrical anvil, it may take the form of a ring secured around the anvil. At any rate, the elastic material must separate the layer of hard material from the anvil. At the same time, the elastic material must not be united with ethe layer of hard material, as by welding. It is therefore seen that in contrast to the generally accepted practice of the prior art wherein it was considered to be important to avoid any displacement between the anvil and the adjoining brittle material to be welded, we have discovered that we can substantially reduce the danger of breaking said brittle material during an ultrasonic welding operation by providing a layer of elastic material between the anvil and the layer of hard brittle material to be welded. A very efficient and reliable ultrasonic welding method and apparatus is thereby achieved by means of the invention.

It is generally assumed that the hard brittle material breaks because of ultrasonic vibrations in the hard material or because of the large local stresses produced in the hard material by both the pressure of the small working surface of the sonotrode and by the ultrasonic vibrations transmitted by the metal foil. The stresses vary during each revolution of the sonotrode because of the asymmetrical irregularities of the sonotrode or the anvil, or of the materials to be welded. As a matter of fact, both phenomena probably occur at the same time. One plausible explanation for the improved results achieved by the invention is that the elastic material damps the ultrasonic vibrations to a high degree and reduces the stresses produced by the pressure of the sonotrode. Whatever the reasons may be uninterrupted welding seams have been obtained by means of the invention between a foil of ductile metal and a layer of hard and brittle material in a manner that substantially eliminates the risk of breaking the brittle material.

A specific embodiment of a device for ultrasonically welding a ductile metal to a hard material according to the method described hereinbefore comprises a sonotrode in the form of a body of revolution, means for setting the sonotrode into vibration at an ultrasonic frequency in a direction parallel to its axis, and means for rotating the sonotrode about its axis. The device further comprises an anvil cooperating with said sonotrode, means for displacing the instantaneous contact surface of the anvil at the same speed and in the same direction as the instantaneous contact surface of the sonotrode, and means for pressing the ductile metal against the hard material between sonotrode and the anvil. According to the invention, the contact surface of the anvil is covered by a layer of elastic material.

The invention further comprises the product obtained by the method described hereinbefore. This product comprises a foil of ductile metal welded to a layer of brittle and hard material. It is characterized in that the said weld is an uninterrupted welding seam.

Figure 2:
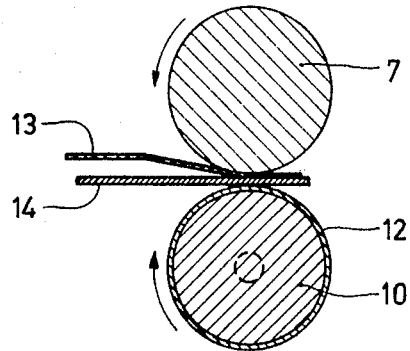

The invention will now be described more fully with reference to the drawings wherein:

FIG. 1 is a diagrammatic plan view of one embodiment of the invention used for ultrasonic welding, and FIG. 2 is a diagrammatic sectional view on an enlarged scale taken along the line A—A of FIG. 1.

FIG. 1 shows a magnetostrictive transducer 1 composed of nickel or other magnetostrictive material and having the shape of a parallelopipedon which constitutes a magnetic circuit. One of the limbs of this circuit is surrounded by a polarizing winding 2 which is connected to a source of direct current (not shown). The other limb is surrounded by an energizing winding 3 which is connected to an electric oscillator (also not shown), for example, of a frequency of 20,000 cycles per second and a power of 400 watts. The winding 3 produces an alternating magnetic field which in turn produces a magnetostrictive phenomenon in the transducer so as to produce an alternating contraction and expansion of the transducer. By means of the magnetostrictive effect, the electrical energy supplied to the winding 3 is converted into mechanical vibration. The resultant longitudinal wave exhibits, in a direction parallel to the axis 4, a node at the center of the transducer and an antinode at each end thereof. The transducer is dimensioned so that its length is equal to one half wavelength of the corresponding wave at the said frequency of operation and for the particular magnetostrictive material used.

The ultrasonic vibrations are transmitted to a cylindrical transmission member 5 secured to transducer 1. The length of member 5 is equal to one half wavelength so that the vibrations are transmitted with the same amplitude and inverted phase to an "exponential transformer" 6 of the same length. Transformer 6 transmits the vibrations with an increased amplitude and again with inverted phase to the center of a welding disc 7. This disc is turned for the radially propagating flexural wave to the frequency previously mentioned so that after the last phase inversion the vibration parallel to the axis 4 finally arrives at the circumference of the disc. The transmission member 5, the transformer 6 and the disc 7 are joined to each other and consist of steel. The diameter of the disc 7 is 5 cms. and the radius of curvature of the rounded-off portion at the circumference of the disc, measured in a plane passing through the axis 4, amounts to approximately 7.5 cms.

The transducer 1 and half of the transmission member 5 are arranged in a cylindrical holder 8 which permits the circulation of cooling water to control the temperature of the welding tool. The holder 8 is closed by a crown of bearings 9. This crown is arranged at the center of the member 5 at a node of the ultrasonic vibration so as not to interfere with the free vibration of the system. By means of roller bearings (not shown), the crown is able to hold the assembly just described and to drive it in a rotary movement about the axis 4 by means of a motor and suitable mechanical transmission member (not shown). An aluminium foil 13 and a glass plate 14 to be joined together by a seam weld are sandwiched between welding disc 7 and a cylindrical steel anvil 10. The aluminum foil may be 0.1 mm. thick and the glass plate 1 mm. thick. These elements are also shown in FIG. 2. The cylindrical steel anvil 10 is made to rotate about its axis by the motor in the crown 9 by means of a shaft 11 which is parallel to the axis 4. According to the invention, the anvil is surrounded by a rubber layer 12 of, for example, 1 mm. thickness. The rotational speeds at the circumference of the disc 7 and of the layer 12 are both equal to 3 mms./second. The diameter of the anvil 10 is 48 mms. A force of 3 kilograms is exerted between the anvil 10 and the disc 7. Under the described conditions, a uniform welding seam may be obtained between the aluminum foil 13 and the glass plate 14 with very little chance of the plate breaking. In contrast, tests previously carried out with the identical material and apparatus, but without the rubber layer 12, resulted in damage to the glass plate. The width of the weld is approximately 1 mm. and the length may be chosen practically at random.

With the welding device described, it has been possible to obtain continuous welds between an aluminum foil 0.05 mm. thick and a glass plate 2.5 mms. thick without the interposition of a layer of elastic material between the glass and the anvil. However, as soon as the thickness of the glass plate was further reduced, for example, to 1 mm., the plate broke down or the weld became very irregular. By interposing a layer of elastic material 12 consisting of a rubber foil 1 mm. thick between the glass plate and the anvil, a welding operation could be successfully carried out again on a 1 mm. thick glass plate.

An aluminum foil of 0.05 mm. also was welded to a molybdenum plate of 1 mm. without the use of a layer of elastic material, but it was found to be impossible to weld the same foil to a molybdenum plate of only 0.25 mm. without the use of an elastic layer consisting, for example, of a rubber foil 1 mm. thick. A further advantage of the use of the elastic layer is that the pressure exerted between the sonotrode and the anvil may be reduced.

As a further example, successful attempts have been made to weld an aluminum foil 0.05 mm. thick to a glass plate 1 mm. thick or to a molybdenum plate 0.25 mm. thick by using as the layer of elastic material a second aluminum foil of 0.05 mm. which was not welded to the plate or to the anvil.

As a final example, an aluminum foil has been welded to a tungsten plate and a copper foil to a glass plate by means of a layer of elastic material consisting of a rubber foil 1 mm. thick.

Many modifications may be made to the above described specific embodiment of the invention without departing from the spirit and scope of the invention, which is limited only as defined in the appended claims.

What we claim is:

1. Ultrasonic apparatus for welding a first workpiece composed of a ductile metal to a second workpiece composed of a hard material, comprising a sonotrode in the form of a body of revolution having a given axis, means for vibrating said sonotrode at an ultrasonic frequency in a direction parallel to said axis, means for rotating said sonotrode about said axis, a support member spaced apart from the operative surface of said sonotrode so as to sandwich therebetween said first and second workpieces to be joined, a layer of elastic material interposed between said support member and the adjacent workpiece so as to form a contact surface therewith, means for moving said contact surface at the same speed and in the same direction as the contact surface formed between the sonotrode and its adjacent workpiece, and means for urging said sonotrode and said support member together so as to force said first workpiece against said second workpiece.

2. Welding apparatus as described in claim 1 wherein said support member comprises a body of revolution having a given axis and wherein said support member is rotatable about said axis, said layer of elastic material being shaped in the form of a ring which girds the contact surface of the support member.

3. Welding apparatus as described in claim 1 wherein said sonotrode and said support member each comprise a cylinder having a longitudinal axis, said cylinders being positioned so that said longitudinal axes are parallel.

4. Welding apparatus as described in claim 3 wherein said means for moving comprises means for rotating said support cylinder about its said longitudinal axis.

5. Welding apparatus as described in claim 1 wherein said support member comprises a body of revolution having a given axis arranged in parallel relationship to said sonotrode axis, said support member being rotatable about its given axis.

6. Welding apparatus as described in claim 5 wherein said means for rotating and said means for moving comprises a single driving means coupled to both the sonotrode and the support member so as to rotate each of said bodies in opposite directions about their respective given axis thereby to propel said workpieces between the sonotrode and the support member.

7. Welding apparatus as described in claim 5 wherein said vibrating means comprises a magnetostrictive transducer and a coupling member secured thereto and to said sonotrode, the length of said coupling member being equal to one half wavelength at the vibratory frequency of the apparatus.

8. Welding apparatus as described in claim 7 wherein said transducer comprises an energizing winding supplied with pulses of electric energy having a repetition frequency which is high relative to the speed at which the workpieces are moved.

9. Ultrasonic welding apparatus for bonding together a first object comprising a foil composed of ductile metal and a second object comprising a thin layer composed of a hard brittle material comprising, first and second cylindrical welding members spaced apart to accommodate said first and second objects therebetween and with their longitudinal axes in parallel, means for rotating said first welding member about its longitudinal axis so that it is in rolling contact at its periphery with said first object, means for vibrating said first welding member at an ultrasonic frequency in a direction parallel to its axis, a thin layer of elastic material covering a portion of the periphery of said second welding member and positioned between said second member and said second object, means for rotating said second welding member about its longitudinal axis, said first and second welding members being urged together so as to press said first and second objects together and to propel said objects in a direction transverse to the direction of vibration of said first welding member.

10. Apparatus as claimed in claim 9 wherein said welding members are composed of steel and said elastic layer comprises an annular rubber strip fastened about the periphery of said second welding member.

11. Ultrasonic apparatus for welding a first workpiece comprising a thin foil of aluminum to a second workpiece comprising a layer of glass, said apparatus comprising a sonotrode in the form of a body of revolution having a given axis and positioned adjacent said first workpiece, means for vibrating said sonotrode at an ultrasonic frequency in a direction parallel to axis axis, means for rotating said sonotrode about said axis, a support member comprising a body of revolution having a given axis about which said support member is rotatable, said support member being spaced apart from the operative surface of said sonotrode with its axis parallel to said sonotrode axis so as to sandwich therebetween said first and second workpieces, a layer of elastic material interposed between said support member and said second workpiece so as to form a contact surface therewith, means for moving said contact surface at the same speed and in the same direction as the contact surface formed between the sonotrode and the first workpiece, and means for urging said sonotrode and said support member together so as to force said first workpiece against said second workpiece.

12. An ultrasonic welding method for joining a first member comprising a foil of ductile metal to a second member comprising a layer of hard brittle material which comprises, pressing the first and second members together between a sonotrode in the form of a body of revolution which is in contact with the metal foil and an anvil having a contact surface separated from the layer of hard material by a layer of elastic material, vibrating said sonotrode at an ultrasonic frequency in a direction parallel to its surface of contact with said metal foil, and moving said metal foil and said layer of hard material between said sonotrode and said anvil in a direction perpendicular to the direction of ultrasonic vibration.

References Cited

UNITED STATES PATENTS

| | | | |
|---|---|---|---|
| 2,946,120 | 7/1960 | Jones et al. | 29—470 |
| 3,217,957 | 11/1965 | Jarvie et al. | 29—470.1 X |
| 3,234,641 | 2/1966 | Schneider et al. | 29—470.1 X |
| 3,209,448 | 10/1965 | Jones | 29—407.1 |
| 2,732,887 | 1/1956 | Drew et al. | 29—497.5 X |

FOREIGN PATENTS 1,349,693  9/1963  France.

RICHARD H. EANES, Jr., Primary Examiner

U.S. Cl. X.R.

228—1